(No Model.)
6 Sheets—Sheet 1.

W. H. CARR.
CIRCULAR KNITTING MACHINE.

No. 431,801. Patented July 8, 1890.

WITNESSES:
Frank E. Curtis
B. W. File

INVENTOR:
William H. Carr
by Geo. A. Mosher
Atty.

(No Model.) 6 Sheets—Sheet 2.
W. H. CARR.
CIRCULAR KNITTING MACHINE.

No. 431,801. Patented July 8, 1890.

WITNESSES:
Frank C. Curtis
B. W. File

INVENTOR:
William H. Carr
by Geo. A. Mosher
Atty.

(No Model.) 6 Sheets—Sheet 3.
W. H. CARR.
CIRCULAR KNITTING MACHINE.
No. 431,801. Patented July 8, 1890.
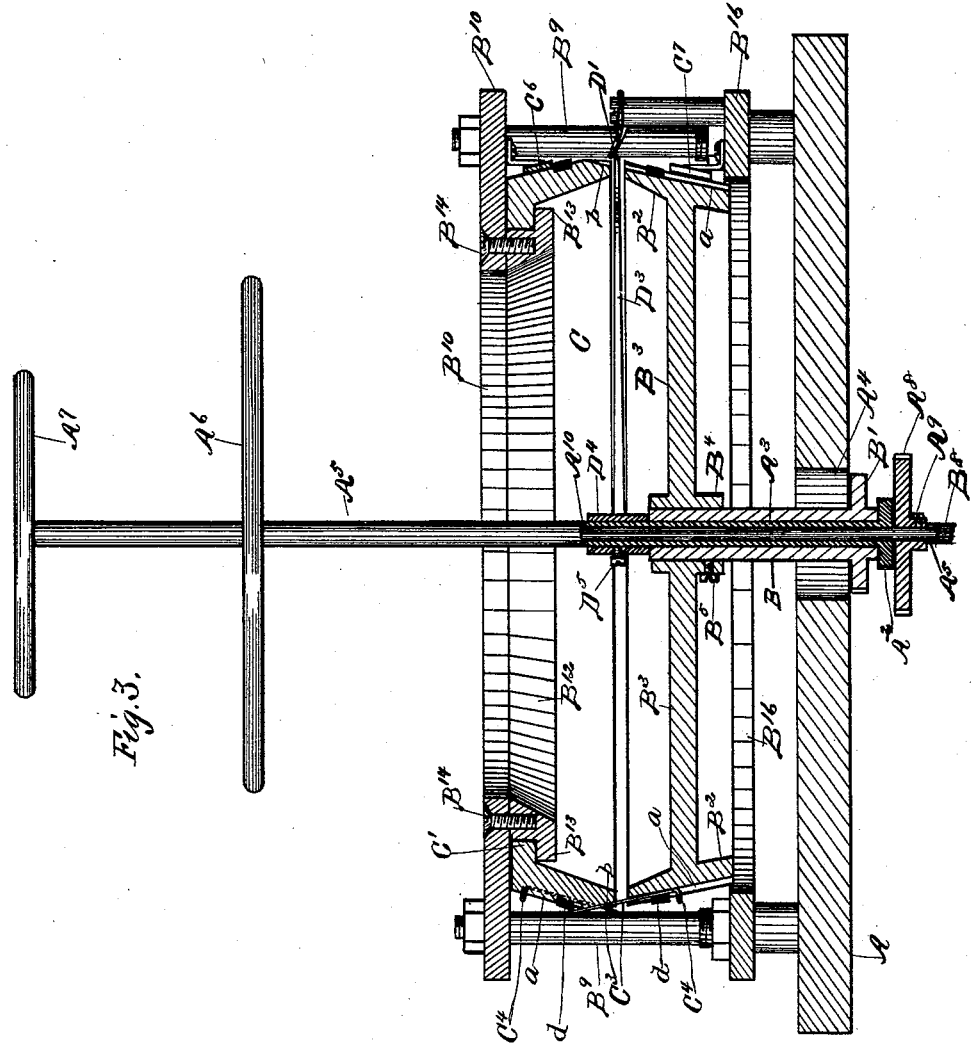
WITNESSES:
Frank C. Curtis
B. W. File
INVENTOR:
William H. Carr
by Geo. A. Mosher
atty.

(No Model.)  6 Sheets—Sheet 4.
W. H. CARR.
CIRCULAR KNITTING MACHINE.
No. 431,801.  Patented July 8, 1890.
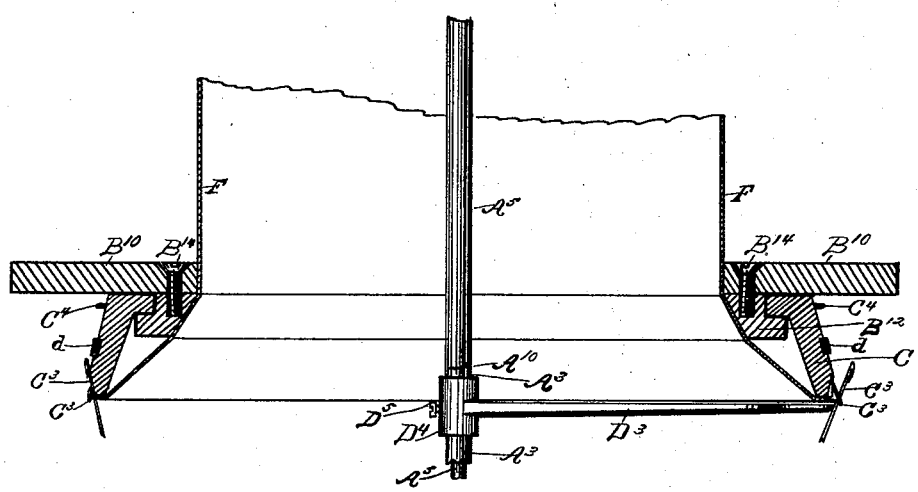
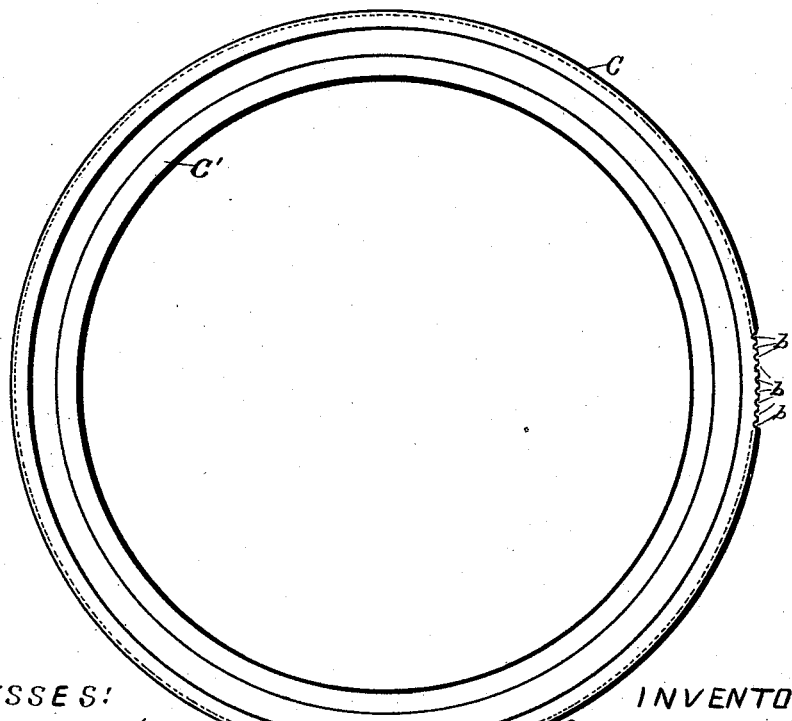
WITNESSES:  INVENTOR:

(No Model.) 6 Sheets—Sheet 5.
W. H. CARR.
CIRCULAR KNITTING MACHINE.

No. 431,801. Patented July 8, 1890.

WITNESSES:
Frank C. Curtis
B. W. File

INVENTOR:
William H. Carr
by Geo. A. Mosher
Atty.

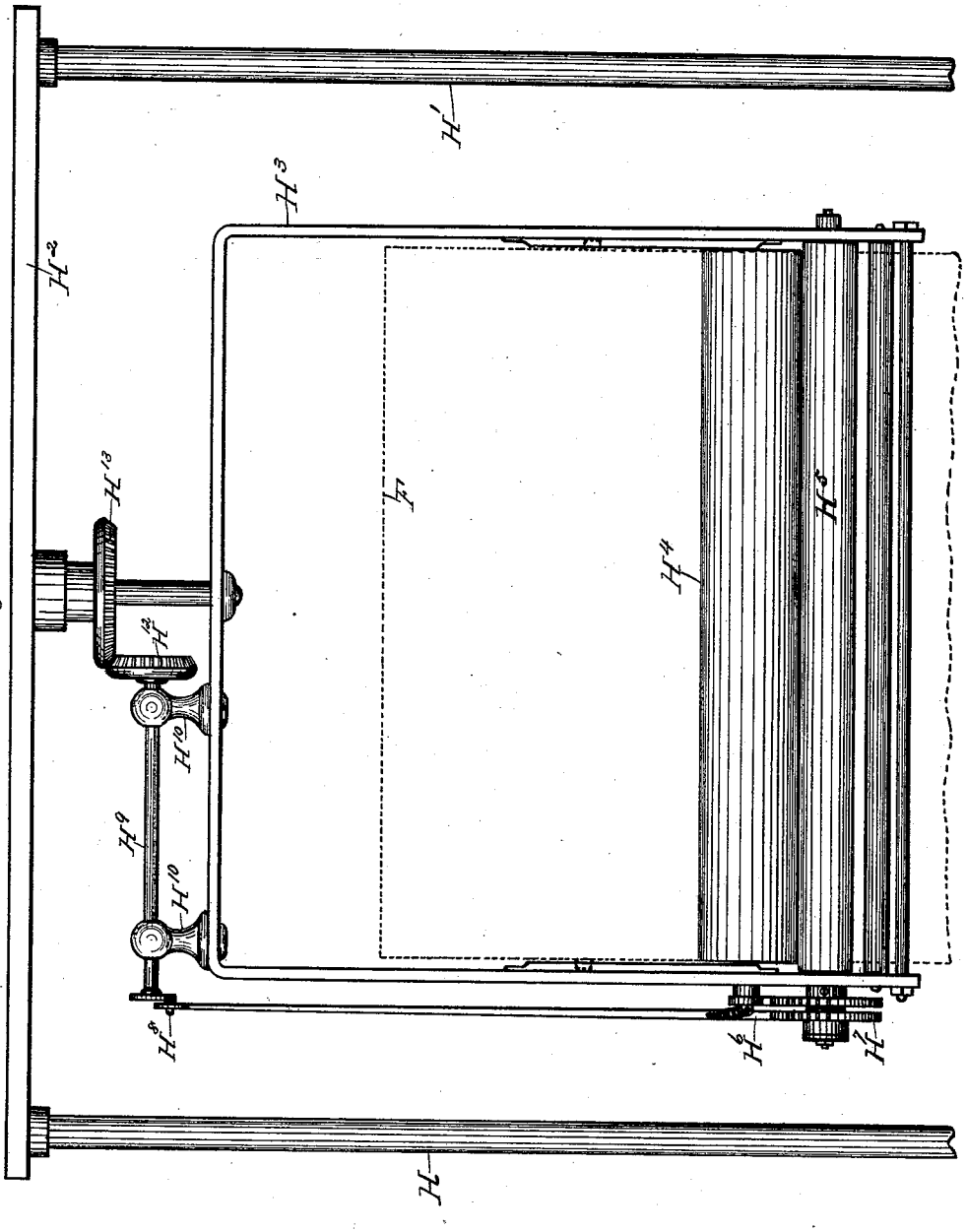

UNITED STATES PATENT OFFICE.

WILLIAM H. CARR, OF TROY, ASSIGNOR OF ONE-HALF TO WILLIAM A. HARDER, OF LANSINGBURG, NEW YORK.

CIRCULAR-KNITTING MACHINE.

SPECIFICATION forming part of Letters Patent No. 431,801, dated July 8, 1890.

Application filed January 14, 1890. Serial No. 336,898. (No model.)

*To all whom it may concern:*

Be it known that I, WILLIAM H. CARR, a citizen of the United States, residing at Troy, county of Rensselaer, and State of New York, have invented certain new and useful Improvements in Circular-Knitting Machines, of which the following is a specification.

My invention consists of the novel construction and combination of parts hereinafter described and subsequently claimed.

Reference may be had to the accompanying drawings and the letters of reference marked thereon, which form a part of this specification.

Similar letters refer to similar parts in the several figures therein.

My invention relates more particularly to rib-machines which employ two needle-cylinders, one above the other, in which the several stitches or loops are formed in substantially the same manner as in the Park and Ells machine described in Patent No. 15,492, issued August 5, 1856, to which reference may be had.

Figure 1:
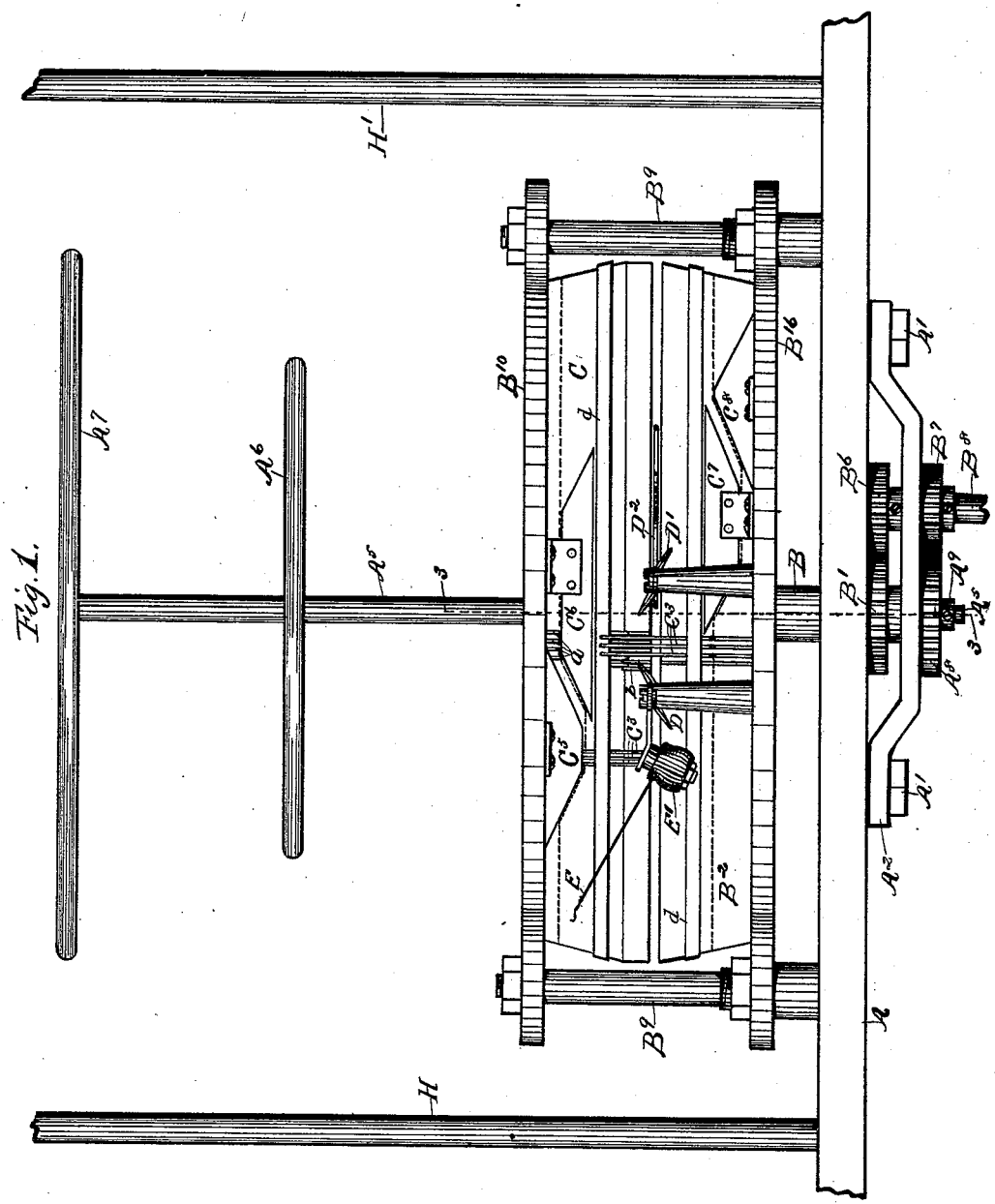
Figure 2:
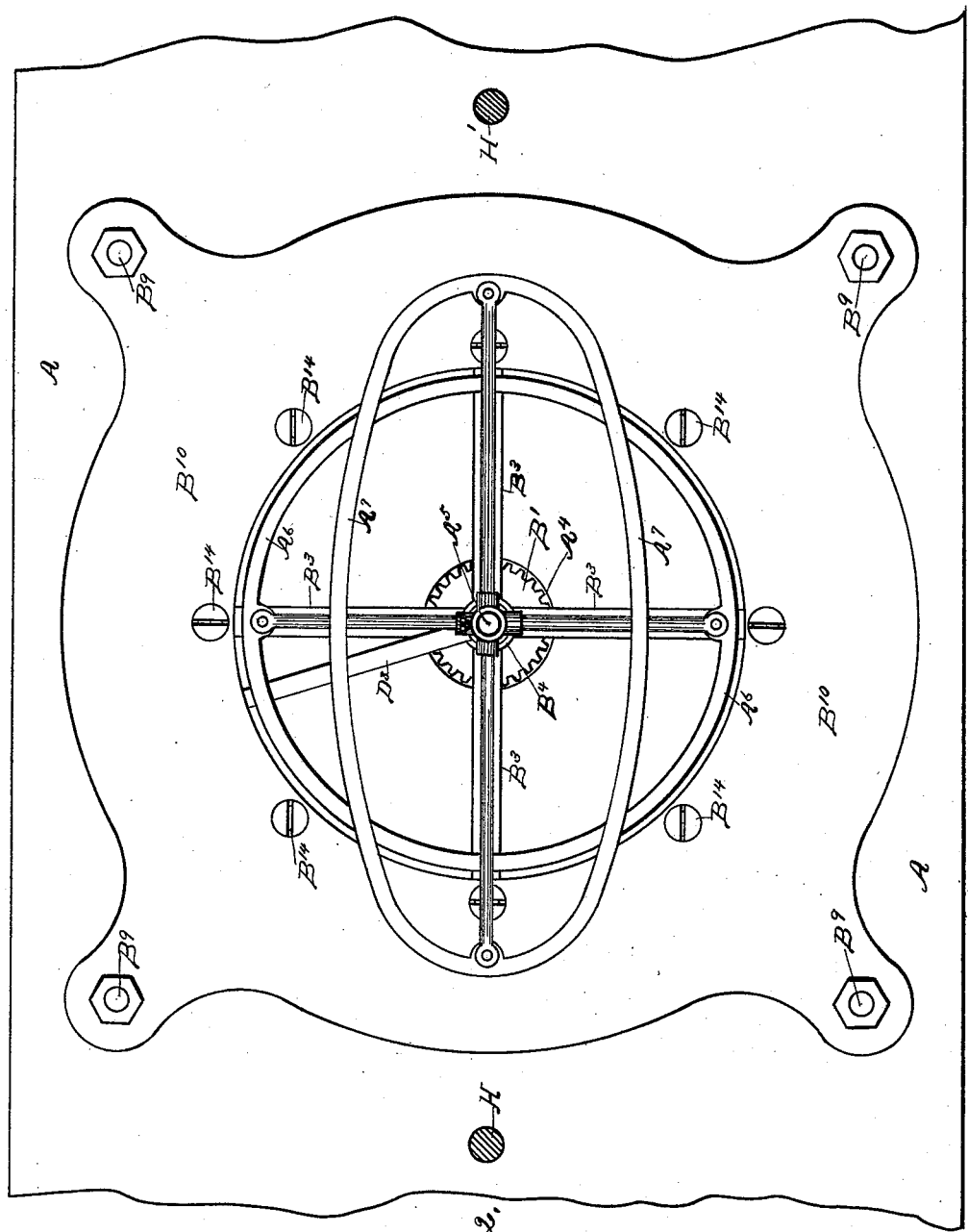
Figure 6:
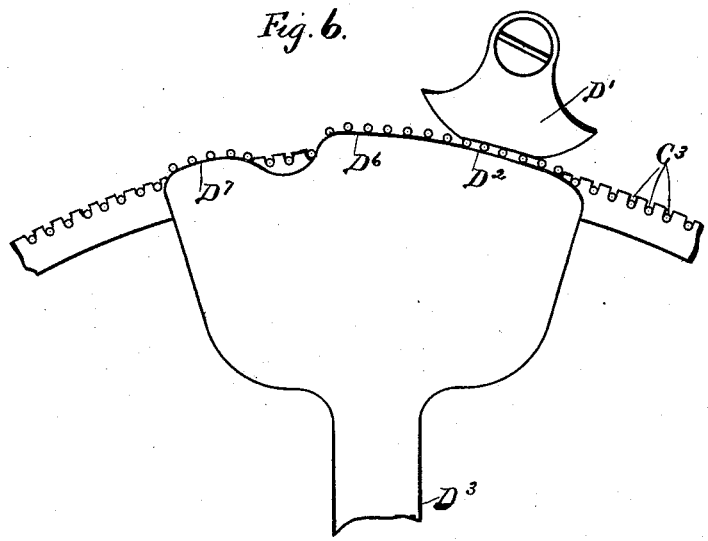
Figure 7:
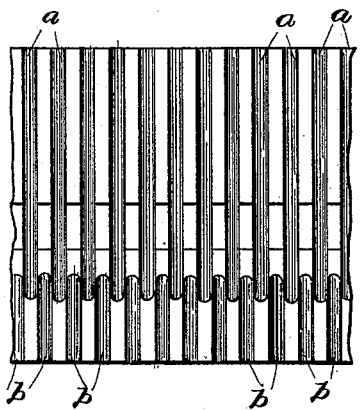

Figure 1 of the drawings is a side elevation of the machine without the "take-up" mechanism mounted upon a supporting-table. Fig. 2 is a top view of that portion of the device shown in Fig. 1. Fig. 3 is a central vertical section of the main portion of the machine, taken on the broken line 3 3 in Fig. 1. Fig. 4 is a similar section of the upper or first cylinder and its supports, including the tubular fabric. Fig. 5 is a bottom view of the upper cylinder detached. Fig. 6 is a top view, on an enlarged scale, of the inner presser detached and a portion of the lower cylinder and needles, showing the action of the presser upon such needles. Fig. 7 is a side elevation of a portion of the first cylinder on an enlarged scale. Fig. 8 is a side elevation of a take-up mechanism for taking up the work from the knitting-cylinders.

The main object of my invention is to adapt a two-cylinder knitting-machine for use with any known take-up mechanism heretofore used with a single-cylinder machine; also, to reduce friction and facilitate the movements of some of the parts. I accomplish these objects by making the first cylinder, the needles of which receive the yarn from the feed or sinker wheel, the upper cylinder, and driving it by contact with the needles in the second or lower cylinder. The second cylinder is positively driven and the first cylinder is principally supported by the tube of knitted fabric as it hangs from the take-up, thereby almost wholly relieving the guide-bearings of such cylinder from the weight of the cylinder, which reduces the frictional resistance of such bearings.

Secured to the lower side of a bed-plate or table A by screws A' is a secondary plate or strap $A^2$, provided with a vertical sleeve $A^3$, forming a part of or fixed to the strap and extending up through aperture $A^4$ in the bed-plate. Passing down through the strap and sleeve is a shaft $A^5$, rotary in such sleeve. This shaft is provided at its upper end with the work-guides $A^6$ and $A^7$ and at its lower end with a cogged wheel $A^8$, fixed thereon, as by set-screw $A^9$. The shaft is supported in the sleeve by the shoulder $A^{10}$, which bears upon the upper end of sleeve $A^3$. Surrounding the sleeve $A^3$ is another sleeve B, rotary thereon, provided at its lower end with a cogged wheel B', fixed thereon, and at its upper end with the lower or second cylinder $B^2$, having arms $B^3$, radiating from the hub $B^4$, fixed upon the sleeve by set-screw $B^5$. Motion is communicated to the rotary parts named by means of the cogged wheels $B^6$ and $B^7$, fixed upon power-shaft $B^8$. (Shown with a part broken away.)

Projecting upward vertically from the table are four posts $B^9$, which support at their upper ends a ring-plate $B^{10}$. The upper or first cylinder is supported and guided by the ring $B^{12}$, having an outwardly-projecting annular flange $B^{13}$. The cylinders are frusto-conical in outward form, and the first cylinder is a ring without hub or radial arms, but provided with an internally-projecting flange C'. The ring $B^{12}$ is passed from the lower side up into the first cylinder until the flange $B^{13}$ strikes and supports the flange C' and is then secured to the ring-plate by the screws $B^{14}$, as shown in Fig. 3. The periphery of the ring $B^{12}$ and the upper surface of its flange $B^{13}$ form a slideway or guide and bearing-seat for the cylinder C, rotary or revoluble thereon.

Although the parts C and $B^2$ are not cylindrical but frusto-conical in external form, I term them "cylinders," that being the accepted term for the needle-supporting parts in a circular machine. The two cylinders are each provided with the usual needle-grooves $a$, forming a series of equidistant grooves on the periphery of each cylinder, extending entirely around the same, only a part of the series being shown in the drawings. A second and similar series of needle-grooves is formed on the lower part of the periphery of the first cylinder by introducing a groove $b$ between each pair of the grooves $a$. The beds of the needle-grooves form sectional planes extending longitudinally of the grooves and corresponding with the bevel or incline of the conical cylinders. The bases or ends of these frusto-conical cylinders having the larger diameter are adjacent to each other, and if the planes occupied by the several needle-grooves in the two cylinders were projected toward each other they would intersect, and the needles $C^3$ occupying such grooves would interlock or mesh with each other, as shown in Figs. 3 and 4. The bed-planes of grooves $b$ are angular to those of grooves $a$ in the same cylinder, and severally form extensions of the bed-planes of the several subjacent needle-grooves in the second cylinder, and the needles of the second cylinder occupy grooves in both cylinders, as shown in Fig. 3, whereby the first cylinder is driven by the needles in the second cylinder, the latter being positively driven by gearing, as before described.

The needles are held within their grooves in the usual manner, as by the bands $d$, of rubber or other yielding material, and actuated in the usual manner by one or more cams, which are fixed to engage with the projecting needle-shanks $C^4$. The cams $C^5$ and $C^6$, fixed upon ring-plate $B^{10}$, actuate the needles in the first cylinder to respectively drive them down and up along the grooves $a$ therein. The cams $C^7$ and $C^8$, fixed upon the ring-plate $B^{16}$, actuate the needles in the second cylinder to respectively drive them down and up along the grooves $a$ therein and the grooves $b$ in the first cylinder. The pressers D and D', supported from ring-plate $B^{16}$, serve to close the beards of the needles in the respective cylinders as the needles of the revolving cylinders are carried past them. To insure contact of presser D' with the beards of the second cylinder-needles, they are forced outward, as shown in Fig. 6, from their groove-beds as they pass the presser by a fixed cam $D^2$, secured to or forming a part of the outer end of arm $D^3$. This arm has on its inner end a hub $D^4$, adapted to receive the upper end of the fixed sleeve $A^3$, to which it is secured by the set-screw $D^5$. The outer end is also provided with a cam $D^6$, which projects a little farther from the hub $D^4$ than cam $D^2$ and serves to force the second-cylinder needles out from the cylinder in opposition to the force of the take-up mechanism, and thereby assist the preceding needles in casting off their stitches as they are forced downward by cam $C^7$. The outer end of the arm has a third cam $D^7$, which serves to force the second-cylinder needles outward from the cylinder as they are driven upward by the cam $C^8$ to prevent their points from being drawn in by the fabric to such a degree as to cause them to strike the lower edge of the first cylinder before they enter the grooves $b$.

From the foregoing it will be seen that a very considerable resistance is offered to the revoluble movements of the second cylinder, which is not found in connection with the first cylinder.

It is well known to those skilled in the art of knitting by cylinder-machines that the loops formed by the first cylinder are loose and offer slight resistance to the movements of the needles in their grooves, while those formed by the second cylinder in finishing the fabric are frequently quite tight, affording greater resistance to such needle movements, the yarn E being fed by sinker-wheel E' to the needles of the first cylinder in the usual well-known manner and in sufficient quantity to form large or loose loops thereon, which are afterward interlooped and consequently tightened by the needles of the second cylinder in the usual well-known manner, wherefore the cylinder which first receives by its needles the yarn from the sinker-wheel is called the "first" cylinder, and the other cylinder is called the "second."

I have ascertained that if the second cylinder is driven positively—that is, by gearing it with a suitable power-shaft, substantially as shown and described—the first cylinder may be placed over it in an inverted position and driven by the needles of the second cylinder. All the needles of the second cylinder simultaneously occupy their respective grooves $b$ in the first cylinder, except the few which are in engagement with cams $C^7$ and $C^8$. Such an arrangement and means of driving the upper cylinder avoids the necessity of radial arms, shafting, and gearing for driving such cylinder, leaving the inner space through the cylinder clear for the passage of the knitted fabric F up through it to the usual or any known form of take-up mechanism, as shown in Fig. 4. Furthermore, I am able to utilize the tensional force exerted upon the fabric by the take-up to reduce the frictional resistance of the upper cylinder upon its guide-bearings, such force, when properly adjusted, being approximately the same exerted in an upward direction as that exerted in a downward direction by the weight of such cylinder, so that there is little or no pressure of the latter upon its bearings. I am thus able to impart to the cylinders an easy positive and steady movement which is not appreciably affected by variations in the quality of the yarn; also, to adapt the mechanism to any well-known knitting-table having any of the known forms of superimposed take-up.

I have shown in Fig. 8 the form of take up mechanism shown and described in United States Letters Patent No. 216,655, issued to me June 17, 1879, to which reference may be had. The uprights H H', erected from bed-plate A, as shown in Fig. 1, support at their upper ends, as shown in Fig. 8, a cross-bar $H^2$. From this cross-bar depends a revoluble frame $H^3$, which supports the take-up roll $H^4$, around which the knitted fabric (represented by broken lines F) is wound after passing between the friction-roll $H^5$ and the roll $H^4$. The friction-roll is driven by pawl $H^6$, engaging with ratchet $H^7$, fixed upon the roll and connected with wrist-pin $H^8$ in a disk fixed upon one end of shaft $H^9$. The shaft is supported by the posts $H^{10}$, fixed upon the revoluble frame, and is provided with a bevel-gear $H^{12}$, which meshes with the bevel-gear $H^{13}$, fixed upon the cross-bar. Revoluble movements are imparted to the pendent frame $H^3$ by means of the tubular web of fabric which revolves with the cylinders, and as the gear $H^{12}$ travels with the frame around the fixed gear rotary movements are imparted to the shaft $H^9$, and through the wrist-pin, pawl, and ratchet-wheel $H^7$ to the friction-roll $H^5$, substantially as described in said Patent No. 216,655, which acts to draw the web of knitted fabric up through the first or upper cylinder with such tensional force as may be desired.

What I claim as new, and desire to secure by Letters Patent, is—

1. In a knitting-machine, the combination, with a revoluble needle-cylinder, a driving-shaft, gear-connections for connecting the shaft and cylinder, fixed cams for actuating the needles, fixed inner cams for guiding the needles in such cylinder, and fixed outer pressers, of a superimposed inverted needle-driven needle-cylinder provided with grooves adapted to receive the second-cylinder needles, and fixed cams for actuating the needles of the first cylinder, substantially as described.

2. In a knitting-machine, the combination, with a revoluble needle-cylinder, means for positively imparting revoluble movements thereto, fixed cams for actuating the needles, fixed cams for guiding the needles, and fixed pressers, of a superimposed inverted revoluble needle-driven ring-cylinder provided with an annular bearing-flange, an annular seat adapted to receive and guide such flange, cylinder-supported needles, fixed cams for actuating the needles, and superimposed take-up mechanism adapted to take the knitted fabric up through the ring-cylinder, substantially as described.

3. In a knitting-machine, the combination, with a revoluble frusto-conical needle-cylinder, direct connections with a prime motor for communicatng revoluble movements thereto, fixed cams for actuating the needles, fixed cams for guiding the needles, and fixed pressers, of a superimposed inverted needle-driven needle-cylinder revoluble in suitable bearings provided with needle-grooves angular to the needle-grooves in the motor-driven cylinder and other grooves alternating with such needle-grooves severally located in line with the needle-grooves in the motor-driven cylinder and adapted to receive the needles of such cylinder, and fixed cams for actuating the needles on the needle-driven cylinder, substantially as described.

In testimony whereof I have hereunto set my hand this 4th day of January, 1890.

WILLIAM H. CARR.

Witnesses:
FRANK C. CURTIS,
CHAS. L. ALDEN.